(12) United States Patent
Phatak et al.

(10) Patent No.: US 8,950,490 B2
(45) Date of Patent: Feb. 10, 2015

(54) METHODS OF USING CELLULOSE IN VARIOUS OILFIELD APPLICATIONS

(75) Inventors: Alhad Phatak, Stafford, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 261 days.

(21) Appl. No.: 13/407,234

(22) Filed: Feb. 28, 2012

(65) Prior Publication Data

US 2013/0220607 A1    Aug. 29, 2013

(51) Int. Cl.
  *E21B 43/22* (2006.01)
  *E21B 43/28* (2006.01)

(52) U.S. Cl.
  CPC .................................. *E21B 43/28* (2013.01)
  USPC ........ 166/304; 166/279; 166/300; 166/305.1; 166/307

(58) Field of Classification Search
  None
  See application file for complete search history.

(56) References Cited

U.S. PATENT DOCUMENTS

| | | | |
|---|---|---|---|
| 5,290,349 A | 3/1994 | Chen | |
| 6,732,803 B2 | 5/2004 | Garcia et al. | |
| 6,808,020 B2 | 10/2004 | Garcia et al. | |
| 2012/0028855 A1* | 2/2012 | Miller | 507/129 |

OTHER PUBLICATIONS

Xiong et al. Solubility of cellulose in ZnCl2 aqueous solution and structure of regenerated cellulose. School of Light Industry and Food Sciences, South China University of Technology (2010), 38(2), pp. 23-27.
Cao et al. Acid hydrolysis of cellulose in zinc chloride solution. Applied Biochemistry and Biotechnology (1995), 51/52, pp. 21-28.
Xu et al. Ultraviolet spectra and structure of zinc—cellulose complexes in zinc chloride solution. Journal of Applied Polymer Science, (1999), 71(9), pp. 1441-1446.
Lushchik et al. Formation of spherulitic structures in aqueous solutions of cellulose in zinc chloride (1990), 32(7), pp. 556-558.
Lushchik et al. Manufacture of regenerated cellulose fibers and films from aqueous solutions of cellulose in zinc chloride (1988), (6), pp. 6-9.
Aksel'rod et al. Physicochemical phenomena of the interaction of cellulose with concentrated zinc chloride solutions. (1970), No. 57, pp. 180-196.
Betrabet et al. Studies in Swelling of cellulose. I. Intracrystalline swelling and decrystallization in zinc-chloride treated cotton cellulose. Cellulose Chemistry and Technology (1969), 3(4), pp. 309-323.

\* cited by examiner

*Primary Examiner* — Zakiya W Bates
(74) *Attorney, Agent, or Firm* — Jeremy D. Tillman; Rachel Greene; Tim Curington

(57) ABSTRACT

A method of well treatment that includes providing a well treatment composition containing a non-functionalized cellulose material and a halide salt composition containing at least zinc halide, calcium halide or a mixture thereof, and placing the well treatment composition within a wellbore or a subterranean formation, and wherein the halide salt composition dissolves at least a portion of the non-functionalized cellulose material.

18 Claims, 1 Drawing Sheet

METHODS OF USING CELLULOSE IN VARIOUS OILFIELD APPLICATIONS

CROSS-REFERENCE TO RELATED APPLICATIONS

Not Applicable.

TECHNICAL FIELD

This present disclosure relates generally to the field of additives for oilfield application, and relates more particularly, but not by way of limitation, to methods of using cellulose in various oilfield applications.

BACKGROUND

Hydraulic fracturing of oil or gas containing reservoirs is a technique routinely used to improve or stimulate the recovery of hydrocarbons. In such treatments, hydraulic fracturing is usually accomplished by introducing a proppant-laden treatment fluid into a producing interval at high pressures and at high rates sufficient to crack the rock open. This fluid induces a fracture in the reservoir as it leaks off in the surrounding formation and transports proppant into the fracture. After the treatment, proppant remains in the fracture in the form of a permeable and porous proppant pack that serves to maintain the fracture open as hydrocarbons are produced. In this way, the proppant pack forms a highly conductive pathway for hydrocarbons and/or other formation fluids to flow into the wellbore.

Typically, viscous fluids or foams are employed as fracturing fluids in order to provide a medium that will have sufficient viscosity to crack the rock open, adequately suspend and transport solid proppant materials, as well as decrease loss of fracture fluid to the formation during treatment (commonly referred to as "fluid loss"). While reduced fluid loss allows for better efficiency of the treatment, higher fluid loss corresponds to fluids "wasted" in the reservoir, and implies a more expensive treatment. Also, it is known that the degree of fluid loss can significantly depend upon formation permeability. Furthermore fluid efficiency of a fracture fluid may affect fracture geometry, since the viscosity of the fluid might change as the fluid is lost in the formation. This is the case for polymer-based fracturing fluids that concentrate in lower permeability formations as the fracture propagates due to leak off of the water in the formation, while the polymer molecules remain in the fracture by simple size exclusion from the pores of the reservoir. The fluid in the fracture increases in viscosity as the fracture propagates and the fracture generated will also increase in width as well as in length. In the case of viscoelastic surfactant (VES) based fluids, the fracturing fluid does not concentrate since the fracturing fluid is lost in the formation and typically the fractures generated are long and very narrow. Hence, fluid efficiency affects fracture geometry.

For VES based fluids, excessive fluid loss can result in fractures that are narrower than in the case of polymer based fluids. Also, excessive fluid loss may translate into significant job size where hundreds of thousands of additional gallons of water may be pumped to generate the required length of fracture and overcome low fluid efficiency. Fracturing fluids should have a minimal leak-off rate to avoid fluid migration into the formation rocks and minimize the damage that the fracturing fluid or the water leaking off does to the formation. Also the fluid loss should be minimized such that the fracturing fluid remains in the fracture and can be more easily degraded, so as not to leave residual material that may prevent hydrocarbons to flow into the wellbore.

Early fracturing fluids were constituted of viscous or gelled oil but, with the understanding that formation damage due to water may not be as important as originally thought, aqueous fracturing fluids mainly consisting of "linear" polymeric gels comprising guar, derivatized guar, cellulose, or derivatized cellulose were introduced. In order to attain a sufficient fluid viscosity and thermal stability in high temperature reservoirs, linear polymer gels were partially replaced by cross-linked polymer gels such as those based on guar crosslinked with borate or polymers crosslinked with metallic ions. However, as it became apparent that crosslinked polymer gel residues might not degrade completely and leave a proppant pack with an impaired retained conductivity, fluids with lower polymer content were introduced. In addition, some additives were introduced to improve the cleanup of polymer-based fracturing fluids. These included polymer breakers. Nonetheless the polymer based fracturing treatments leave proppant pack with damaged retained conductivity since the polymer fluids concentrate in the fracture while the water leaks off in the reservoir that may impair the production of hydrocarbons from the reservoir.

Other fracturing fluids with improved cleanup, i.e. that leave a proppant pack with higher retained conductivity, have been developed. Examples are fluids that use viscoelastic surfactants (VES) as viscosifiers. The viscoelastic surfactant molecules, when present at a sufficient concentration, may aggregate into overlapping worm- or rod-like micelles, which confer the necessary viscosity to the fluid to carry the proppant during fracturing. At very high shear rate however, the viscosity may decrease. Also, the surfactant worm- or rod-like micelles tend to disaggregate by contact with hydrocarbons and, if no surfactant emulsion is effectively formed, the surfactant molecules are normally carried along the fracture, to the well bore, during the hydrocarbon backflow.

Yet another approach to limit the damage of the proppant pack, is to use water based treatments with friction reducers (referred as slickwater treatments), and pump the fracturing fluids at much higher rates in the formation. The proppant is carried to the formation due to the high flow rates. The limitation of the treatments is that the maximum proppant concentration that can be placed is limited to a small concentration since the fluid has low viscosity. Another limitation is very low fluid efficiency and therefore the size of the slickwater treatments is much larger than treatments that employ viscous fracturing fluids.

Based on reservoir simulations and field data, it is commonly observed that production resulting from a fracturing treatment is often lower than expected. This phenomenon is particularly the case in tight gas formations. Indeed, production can be decreased significantly by concentrated polymer left in the fracture due to leak off of the fracturing fluid during treatment. Filter cakes may result in poor proppant pack cleanup due to the yield stress properties of the fluid. This may happen when a crosslinked polymer based fluid is pumped that leaks off into the matrix and becomes concentrated, and extremely difficult to remove. Breaker effectiveness may thus become reduced, and viscous fingering inside the proppant pack may occur which further results in poor cleanup. Furthermore, the filter cake yield stress created by the leak off process can occlude the fracture width and restrict fluid flow, resulting in a reduction in the effective fracture half-length.

Accordingly, there is also a need for methods for treating subterranean formations using fluids which enable efficient pumping, which significantly decrease and control the leak off relative to conventional fracturing treatments in order to reduce the damage to production, while having good cleanup properties as well as improved fluid efficiency (i.e. providing less expensive and time-consuming treatment). These needs are met, at least in part, with the following application.

Furthermore, fractures in reservoirs normally have the highest flow capacity of any portion of the reservoir formation. These fractures in the formation may be natural or hydraulically generated. In a natural fault in the rock structure, the high flow capacity results either from the same factors as for natural fractures or from the fracture being open for example due to natural asperities or because the rock is hard and the closure stress is low. In artificially created fractures, such as those created by hydraulic fracturing or acid fracturing, the high flow capacity results from the fracture being either propped with a very permeable bed of material or etched along the fracture face with acid or other material that has dissolved part of the formation.

Fractures of interest in this field are typically connected to the formation and to the wellbore. Large volumes of fluids will travel through fractures due to their high flow capacity. This allows wells to have high fluid rates for production or injection. Normally, this is desirable.

However, in the course of creating or using an oil or gas well, it is often desirable to plug or partially plug regions in the formation, thereby reducing its flow capacity. Typically the reasons for plugging these fractures are that a) they are producing unwanted water or gas, b) there is non-uniformity of injected fluid (such as water or $CO_2$) in an enhanced recovery flood, or c) expensive materials (such as hydraulic fracturing fluids during fracturing) are being injected into non-producing areas of the formation. This latter case can be particularly deleterious if it results in undesirable fracture growth because at best it wastes manpower, hydraulic horsepower, and materials, to produce a fracture where it is not needed, and at worst it results in the growth of a fracture into a region from which undesirable fluids, such as water, are produced.

Past techniques for plugging fractures have included cement systems, hydrating clays, and both crosslinked and non-crosslinked polymer solutions. The disadvantages of cement systems are the requirements for expensive materials and well work, and the systems' inability to travel down the fracture without bridging prematurely. The hydrating clays require the complexity and cost of pumping oil-based systems plus expensive well work. The hydrating clays also have the same problem as the cement with regard to placement: needing to avoid premature bridging; they also have the requirement of needing to hydrate fully along the fracture. The polymer systems often fail due to their lack of flow resistance in very permeable fractures and because the materials are expensive considering the large volumes that are required. There is a need for an inexpensive, reliable, easily placed, effective well plugging material and methods for use during well completion or remediation, especially stimulation, and during fluids production.

BRIEF DESCRIPTIONS OF DRAWINGS

SUMMARY OF THE DISCLOSURE

Figure 1:
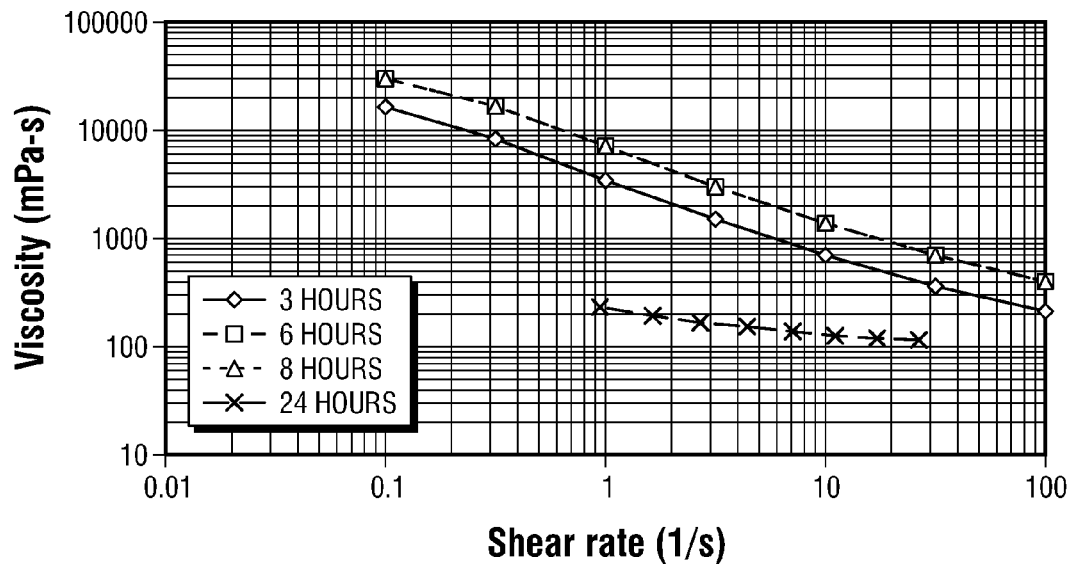
FIG. 1 represents the viscosity as compared to the shear rate of Example 2.

According to an aspect of the present disclosure, one or more embodiments relate to a method of well treatment, the method comprising: providing a well treatment composition comprised of a non-functionalized cellulose material and a halide salt composition comprised of at least zinc halide, calcium halide or a mixture thereof, and placing the well treatment composition within a wellbore or a subterranean formation, and wherein the halide salt composition dissolves at least a portion of the non-functionalized cellulose material.

In embodiments, disclosed herein is a method of well treatment, the method comprising: providing a well treatment composition comprised of a non-functionalized cellulose material and a halide

DETAILED DESCRIPTION

Cellulose is a ubiquitous polymer in plant matter, and may be processed into a number of cotton, wood and paper products for a wide variety of applications. Because cellulose is insoluble in water and other water-based media, it is often functionalized to increase its solubility in water. Specifically, for oilfield applications, examples of functionalized cellulose include hydroxy ethyl cellulose and carboxy methyl hydroxy ethyl cellulose, which have used in cementing, drilling, stimulation and sand control processes. However, non-functionalized cellulose is not often used due to its insolubility in aqueous solvents.

According to an aspect of the present disclosure, one or more embodiments relate to a method of well treatment, the method comprising: providing a well treatment composition comprised of a non-functionalized cellulose material and a halide salt composition comprised of at least zinc halide, calcium halide or a mixture thereof, and placing the well treatment composition within a wellbore or a subterranean formation, and wherein the halide salt composition dissolves at least a portion of the non-functionalized cellulose material.

In embodiments, disclosed herein is a method of well treatment, the method comprising: providing a well treatment composition comprised of a non-functionalized cellulose material and a halide solvent composition, heating the composition to a temperature of at least 150° F. to dissolve the non-functionalized cellulose, pumping a chemical species into the wellbore, and reacting the chemical species with dissolved non-functionalized cellulose material to form a functionalized cellulose. Examples of suitable chemical species are acids (organic and inorganic), halogenoalkanes, epoxides, halogenated carboxylic acids, and combinations of the above. Examples of organic acids acetic acid, propionic acid and butyric acid, which result in the formation of cellulose esters. Inorganic acids such as sulfuric and nitric acid may be used to convert cellulose to cellulose sulfate and nitrocellulose respectively. Examples of halogenoalkanes include chloromethane, chloroethane, and mixtures thereof. These react with non-functionalized cellulose to form methylcellulose, ethylcellulose, and ethyl methyl cellulose respectively. Examples of epoxides include ethylene oxide and propylene oxide. These can be reacted to cellulose to yield hydroxyethyl cellulose, hydroxypropyl cellulose, and other cellulose derivatives. A common example of a halogenated carboxylic acid is chloroacetic acid, which can convert cellulose to carboxymethyl cellulose. Similarly, alkali salts of these halogenated carboxylic acids may also be employed. The functionalized cellulose materials thus formed may be dissolved in aqueous media and further reacted with metals such as boron, zirconium, titanium, to yield crosslinked polymer gels.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from or injection rates into a hydrocarbon reservoir. The fracturing methods otherwise use conventional techniques known in the art.

As used herein, the new numbering scheme for the Periodic Table Groups are used as in Chemical and Engineering News, 63(5), 27 (1985).

As used herein, the term "liquid composition" or "liquid medium" refers to a material which is liquid under the conditions of use. For example, a liquid medium may refer to water, and/or an organic solvent which is above the freezing point and below the boiling point of the material at a particular pressure. A liquid medium may also refer to a supercritical fluid.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Described herein is a method of well treatment, that includes providing a well treatment composition comprised of a non-functionalized cellulose material and a halide salt composition comprised of at least zinc halide, calcium halide or a mixture thereof. The well treatment composition is then placed within a wellbore or a subterranean formation, such that the halide salt composition dissolves at least a portion of the non-functionalized cellulose material.

Non-Functionalized Cellulose Material

Non-functionalized cellulose refers to the following chemical structure.

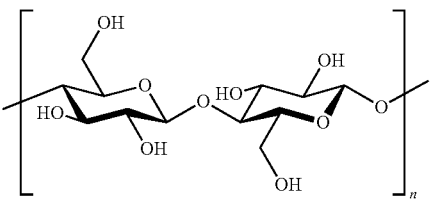

This needs to be contrasted with functionalized cellulose wherein the hydroxyl groups in the cellulose structure have been reacted to form cellulose derivatives such as hydroxyethyl cellulose.

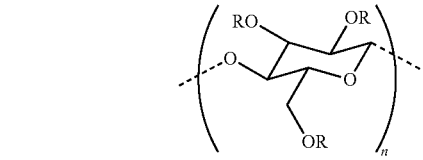

R = H or CH$_2$CH$_2$OH

In embodiments, the non-functionalized cellulose is a particle or a fiber. Non-functionalized cellulose particles may have 2 or 3 basic sizes; which are identified herein as "coarse", "medium" and "fine". The coarse non-functionalized cellulose particle material may have a diameter of from about 0.20 mm to approximately 2.35 mm, which is large enough to keep the particle from flowing back out of the fracture and small enough to be placed, for example by various methods and/or with suitable equipment typically used in hydraulic fracturing. The next (or sometimes optionally only) smaller non-functionalized cellulose material ("medium" material) may have a diameter of from about 0.10 mm to about 0.20 mm, which allows these smaller particles to be large enough to form a bridge in the pore spaces formed by the larger material, but not small enough to flow through the pore throats in larger particles. The third material ("fine" material), if it is present, may have a maximum diameter of less than about 0.10 mm.

Of course, instead of the "coarse" and "medium" example given above, if two sizes are used instead of three, they could be "medium" and "fine", or "coarse" and "fine". Although the ranges of the definitions of "coarse", "medium" and "fine" have been given as contiguous, it is preferred that the actual sizes used not be contiguous. For example, although coarse may be from about 0.20 mm to approximately 2.35 mm and "medium" may be from about 0.10 mm to about 0.20 mm in diameter, actual sizes used in a treatment might be about 1 to 2 mm and about 0.1 to 0.2 mm respectively.

As discussed above, the non-functionalized cellulose material may also be a fiber. Suitable fibers may have a length of from about 2 to about 25 mm, of from about 3 to about 18 mm, of from about 6 mm to about 15 mm and from about 8 mm to about 12 mm. These fibers may also have an a denier of from about 0.1 to 20 or from about 0.15 to about 6, or from about 0.6 to about 1.4

Halide Salt Composition

The well treatment composition also contains a halide salt composition, which functions to dissolve at least a portion of the non-functionalized cellulose material. The halide salt composition may be comprised of one or more metal halide salts. Examples of the metal halide salts include zinc halides, such as zinc chloride, zinc bromide or zinc fluoride; and calcium halides, such as calcium chloride, calcium bromide or calcium fluoride.

The halide salt composition may also comprise one or more solvents to dissolve metal halide salt. An example of this solvent is water, which would render the halide salt composition an aqueous solution.

The halide salt composition may be present in the well treatment composition in an amount of from about 1 weight percent to about 95 weight percent, from about 5 weight percent to about 80 weight percent, from about 10 weight percent to about 75 weight percent, from about 15 weight percent to about 60 weight percent, from about 25 weight percent to about 50 weight percent and from about 30 weight percent to about 40 weight percent, based upon the total weight of the well treatment composition.

The halide salt may also be present in the halide salt composition in an amount of at least about 50 weight percent based upon a total weight of the halide salt composition, such as from about 50 weight percent to about 95 weight percent, from about 55 weight percent to about 90 weight percent, from about 60 weight percent to about 85 weight percent, from about 65 weight percent to about 80 weight, and from about 70 weight percent to about 80 weight percent, each based upon the total weight of the halide salt composition. The remaining balance of the halide salt composition be a solvent, such as water.

The well treatment composition may then be placed in the wellbore or subterranean formation. As used herein, the term "placed" refers to mechanism of locating the well treatment composition in the wellbore or subterranean formation by various methods and/or with suitable equipment typically used in various oilfield operations, such as fracturing and cementing. Example "placing" mechanisms include such as, for example, pumping the well treatment composition within the wellbore. In cases where solid cellulose containing materials are to be placed in the wellbore, this can be accomplished by attaching them to tubing and running the tubing-cellulose material assembly to the desired position in the wellbore.

The non-functionalized cellulose material and the halide salt composition may be placed in the subterranean formation or wellbore simultaneously, separately or a combination thereof. For example, the non-functionalized cellulose material (or the halide composition) may be first placed into the subterranean formation or the wellbore and the other material (either the non-functionalized cellulose material or the halide salt composition depending on what was pumped first) may be placed into the wellbore at some point after the first material. Furthermore, if non-functionalized cellulose material is first placed into the subterranean formation and hand the halide salt are separately placed within the wellbore or the subterranean formation, and the method further comprises:

Additionally, the non-functionalized cellulose material may be placed in the subterranean formation or the wellbore at the same time or "simultaneously" such that both the non-functionalized cellulose material and the halide salt composition are included in the same solution with the non-functionalized cellulose material being dissolved in halide salt composition. More specifically, the non-functionalized cellulose material can be mixed with the halide salt composition for 6 hours and at a temperature of about 200° F. (93° C.) before degradation will occur. This combined solution may then be reacted with an additional material such as acids (organic and inorganic), halogenoalkanes, epoxides, and halogenated carboxylic acids and derivatives, and combinations of the above. The alkali halogenated acetate upon reaction with the functionalized cellulose derivative results in a water soluble material, and can trigger changes in water viscosity by means of dissolution or crosslinking.

Fracture Plugging

Fractures in reservoirs normally have the highest flow capacity of any portion of the reservoir formation. These fractures in the formation may be natural or hydraulically generated. In a natural fault in the rock structure, the high flow capacity results either from the same factors as for natural fractures or from the fracture being open for example due to natural asperities or because the rock is hard and the closure stress is low. In artificially created fractures, such as those created by hydraulic fracturing or acid fracturing, the high flow capacity results from the fracture being either propped with a very permeable bed of material or etched along the fracture face with acid or other material that has dissolved part of the formation.

Fractures of interest in this field are typically connected to the subterranean formation and/or to the wellbore. Large volumes of fluids will travel through fractures due to their high flow capacity. This allows wells to have high fluid rates for production or injection. Normally, this is desirable.

However, in the course of creating or using an oil or gas well, it is often desirable to plug or partially plug a fracture in the rock formations, thereby reducing its flow capacity. Typically the reasons for plugging these fractures are that a) they are producing unwanted water or gas, b) there is non-uniformity of injected fluid (such as water or $CO_2$) in an enhanced recovery flood, or c) expensive materials (such as hydraulic fracturing fluids during fracturing) are being injected into non-producing areas of the formation. This latter case can be particularly deleterious if it results in undesirable fracture growth because at best it wastes manpower, hydraulic horsepower, and materials, to produce a fracture where it is not needed, and at worst it results in the growth of a fracture into a region from which undesirable fluids, such as water, are produced.

In embodiments, after well treatment composition is placed in the wellbore or the subterranean formation, at least one plug may be formed in at least one of a perforation, a fracture or the wellbore. The at least one plug is comprised of at least the non-functionalized cellulose material of the well treatment composition, and may be installed for diversion and/or the isolation of various zones in the wellbore or the subterranean formation. Also, after the placement, the fracture may close on the non-functionalized cellulose material after the well treatment composition is pumped into the fracture. Furthermore, the plug may be plurality of plugs, thus isolating one or more regions within the subterranean formation or wellbore.

To prevent particle separation and uneven packing during mixing and injection of the non-functionalized cellulose, the densities of the non-functionalized cellulose particles or fibers should be within about 20% of one another other. Particles are mixed and pumped using equipment and procedures commonly used in the oilfield for cementing, hydraulic fracturing, drilling, and acidizing. These particles may be pre-mixed or mixed on site. They are generally mixed and pumped as a slurry in a carrier fluid such as water, oil, viscosified water, viscosified oil, and slick water (water containing a small amount of polymer that serves primarily as a friction reducer rather than primarily as a viscosifier). In embodiments, the well treatment composition may also comprise a carrier fluid that is not capable of dissolving the non-functionalized material. Additionally, the carrier fluid may not contain the halide salt composition.

Unless the particles have a very low density, and/or the carrier fluid has a very high density, and/or the pump rate is very high, the carrier fluid will normally be viscosified in order to help suspend the particles. Any method of viscosifying the carrier fluid may be used. Water may be viscosified with a non-crosslinked or a crosslinked polymer. The polymer, especially if it is crosslinked, may remain and be concentrated in the fracture after the treatment and help impede fluid flow. In fracturing, polymers are usually crosslinked to increase viscosity with a minimum of polymer. In embodiments, the more polymer may be better than less, unless cost prevents it, and crosslinking adds cost and complexity, so uncrosslinked fluids can be also desirable, bearing in mind that more viscous fluids tend to widen fractures, which may be undesirable.)

In fracturing, it is desirable for the polymer to decompose after the treatment, so the least thermally stable polymer that will survive long enough to place the proppant is often chosen. In embodiments, stable polymers, such as polyacrylamides, substituted polyacrylamides, and others may be advantageous. The choice of polymer, its concentration, and crosslinker, if any, is made by balancing these factors for effectiveness, taking cost, expediency, and simplicity into account Placement of the plugging material is similar to the placement of proppant in hydraulic fracturing. The plugging material is suspended in a carrier fluid to form what will be called a "filling slurry". If a fracture is being created and plugged at the same time, a "Property3D" (P3D) hydraulic fracture simulator is used to design the fracture job and simulate the final fracture geometry and filling material placement. (If an existing fracture is being plugged, a simulator is not normally used.) Examples of such a P3D simulator are FRACADE (Schlumberger proprietary fracture design, prediction and treatment-monitoring software), FRACPRO sold by Pinnacle Technologies, Houston, Tex., USA, and MFRAC from Meyer and Associates, Inc., USA. Whether a fracture is being created and plugged in a single operation, or an existing fracture is being plugged, the fracture wall should be covered top-to-bottom and end-to-end ("length and height") with filling slurry where the unwanted fluid flow is expected. It is not necessary to completely fill the width of the created fracture with the well treatment composition, but it may be necessary to ensure that enough material is pumped to a) at a minimum (should the fracture close after placement of the well treatment composition) create a full layer of the largest ("coarse") size material used across the entire length and height of the region of the fracture where flow is to be impeded, or to b) fill the fracture volume totally with well treatment composition. When at least situation a) has been achieved, the fracture will be said to be filled with at least a monolayer of coarse particles.

The normal maximum concentration needed is three layers (between the faces of the fracture) of the coarse material. If the fracture is wider than this, but will close, three layers is all the filling material needed, provided that after the fracture closes the entire length and height of the fracture walls are covered. If the fracture is wider than this, and the fracture will not subsequently close, then either a) more filling material may be pumped to fill the fracture, or b) some other material may be used to fill the fracture, such as but not limited to the malleable material described above. More than three layers may be wasteful of particulate material, may allow for a greater opportunity of inadvertent undesirable voids in the particle pack, and may allow flowback of particulate material into the wellbore. Therefore, especially if the fracture volume filled-width is three times the largest particle size or greater, then a malleable bridging material may be added to reduce the flow of particles into the wellbore. This should be a material that does not increase the porosity of the pack on closure. Malleable polymeric or organic fibers are products that effectively accomplish this. Concentrations of up to about 9.6 g malleable bridging material per liter of carrier fluid may be used.

The carrier fluid may be any conventional fracturing fluid that will allow for material transport to entirely cover the fracture, will stay in the fracture, and will maintain the material in suspension while the fracture closes. Crosslinked guars or other polysaccharides may be used. Examples of suitable materials include crosslinked polyacrylamide or crosslinked polyacrylamides with additional groups such as AMPS to impart even greater chemical and thermal stability. Such materials may (1) concentrate in the fracture, (2) resist degradation, and provide additional fluid flow resistance in the pore volume not filled by particles. Additionally, wall-building materials, such as fluid loss additives, may be used to further impede flow from the formation into the fracture. Wall-building materials such as starch, mica, and carbonates are well known.

Often it is necessary to plug only a portion of the fracture; this occurs in particular when the fracture is growing out of the desired region into a region in which a fracture through which fluid can flow is undesirable. This can be achieved using the well treatment composition described above if the area to be plugged is at the top or at the bottom of the fracture. There are two techniques to achieve this; each may be used with either a cased/perforated completion or an open hole completion. In the first ("specific gravity") technique the bridging slurry is pumped before pumping of the main fracture slurry and has a specific gravity different from that of the main fracture slurry. If the filling slurry is heavier than the main fracture slurry, then the plugged portion of the fracture will be at the bottom of the fracture. If the filling slurry is lighter than the main fracture slurry, then the plugged portion of the fracture will be at the top of the fracture. The filling slurry will be inherently lighter or heavier than the proppant slurry simply because the particles are lighter or heavier than the proppant; the difference may be enhanced by also changing the specific gravity of the carrier fluid for the particles relative to the specific gravity of the carrier fluid for the proppant.

The second ("placement") technique is to run tubing into the wellbore to a point above or below the perforations. If the objective is to plug the bottom of the fracture, then the tubing is run in to a point below the perforations, and the bridging slurry is pumped down the tubing while the primary fracture treatment slurry is being pumped down the annulus between the tubing and the casing. This forces the filling slurry into the lower portion of the fracture. If the objective is to plug the top of the fracture, then the tubing is run into the wellbore to a point above the perforations. Then, when the filling slurry is pumped down the tubing while the primary fracture treatment slurry is being pumped down the annulus between the tubing and the casing, the filling slurry is forced into the upper portion of the fracture. The tubing may be moved during this operation to aid placement of the particles across the entire undesired portion of the fracture. Coiled tubing may be used in the placement technique.

Specific embodiments of the present disclosure will now be described in detail with reference to the accompanying drawings. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

Fluid Loss

In embodiments, the well treatment composition may be included in various well treatments, such as drilling, cementing and fracturing fluids, to control fluid loss. After the well treatment is completed, the halide salt composition may be pumped into the wellbore or the subterranean formation to dissolve the non-functionalized cellulose and restore the permeability of the subterranean formation or fracture.

As discussed above, hydrocarbons (oil, condensate, and gas) are typically produced from wells that are drilled into the formations containing them. The oil or gas residing in a subterranean formation can be recovered by drilling a well into the formation. A wellbore is typically drilled down to the subterranean formation while circulating a drilling fluid through the wellbore. After the drilling is terminated, a string of pipe, such as a casing, is run into the wellbore. Then, the subterranean formation is usually isolated from other formations using a technique known as well cementing. In particular and for a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

The drilling fluid, cementing fluid or stimulation fluid may include a fluid loss control additive to reduce the loss of fluid, such as water, from the fluid when in contact with permeable subterranean formations and zones. Fluid loss control plays an important role in those oilfield treatment fluids (fracturing, cementing, gravel/frac packing etc). Most of the treatments use a polymer based fluid (guar, guar derivative or hydroxy ethyl cellulose, etc.) to control leak off. These fluids build a low permeability filter cake that reduces the leak-off rate by reducing the diffusion rate of the solvent across the boundary between the bulk of the fluid and the formation (filter cake). For further decrease in leak-off rate macroscopic solids such as fine silica, calcium carbonate, mica, or clays are added to the fluid. Also, the addition of a second soluble polymer such as polyacrylamide, starch, xanthan, etc to the polymer based fluid is not uncommon to control fluid leak-off. One of the problems associated with the use of additives (solids/polymer) to control leak-off is their cleanup after the treatment is done. Inadequate cleanup can result in a decrease in oil/gas productivity. In addition, the use of second polymer gives rise to mixing issues at the surface and higher friction pressures due to increase in polymer loading The non-functionalized cellulose material may also be placed downhole as a linking element between wireline tools or cables. In certain situations it may be desirable to leave the wireline tool or cable temporarily or permanently, wherein the halide salt composition may be pumped into the wellbore to dissolve and detach the linking element from the cable. Additional details regarding wireline technology are described in U.S. Pat. No. 6,808,020 and U.S. Pat. No. 6,732,803, each of which is incorporated by reference herein in its entirety.

EXAMPLES

Example 1

About 0.2 grams of Celluflow C-25 powder, manufactured by Collaborative Laboratories in East Setauket, N.Y. was added to 20 mL samples of various brines. The mixtures were aged at 200° F. (93° C.) in an oil bath for 3 hours and subsequently cooled to ambient temperature. Observations made from the cooled mixtures are summarized below in Table 1.

TABLE 1

Observations from cellulose-brine mixtures of Example 1

| Brine | Brine density (kg/L) | pH | Observation |
| --- | --- | --- | --- |
| Water | 1.0 | 7.0 | No dissolution; powder precipitated |
| Water with HCl | 1.0 | 2 | No dissolution; powder precipitated |
| Potassium chloride (KCl) | 1.2 | 7.9 | No dissolution; powder precipitated |
| Sodium chloride (NaCl) | 1.2 | 7.1 | No dissolution; powder precipitated |
| Sodium bromide (NaBr) | 1.5 | 7.6 | No dissolution; powder precipitated |
| Sodium formate | 1.3 | 10.0 | No dissolution; powder precipitated |
| Potassium formate | 1.6 | 12.1 | No dissolution; powder precipitated |
| Cesium formate | 2.3 | 12.6 | No dissolution; powder precipitated |
| Calcium chloride (CaCl2) | 1.4 | 5.0 | No dissolution; powder precipitated |
| Calcium chloride with HCl | 1.3 | ~0 | No dissolution; powder precipitated |
| Calcium bromide (CaBr2) | 1.7 | 4.4 | No dissolution; powder precipitated |
| Zinc bromide/Calcium bromide (ZnBr2/CaBr2) | 2.2 | 1.6 | Powder dissolved |

As shown above in Table 1, the zinc bromide solution does dissolve the cellulose, while other brines typically employed in the oilfield do not.

Example 2

Figure 2:
FIG. 2 represents the viscosity as compared to the time for Example 2.

2 grams Celluflow C-25 powder (Collaborative Laboratories in East Setauket, N.Y.) were added to 100 ml of 18.5 lbm/gal (2.2 kg/L) $ZnBr_2/CaBr_2$ brine and placed in a 200° F. (93° C.) oven. Samples of this mixture were taken after periodic intervals, cooled to ambient temperature, and their viscosities were measured on a Gemini 150 (Malvern Instruments) rheometer. As shown in FIGS. 1 and 2, the evolution of viscosity as a function of time shows that the cellulose was not completely dissolved after 3 hours. After 6 hours, complete dissolution was observed, and after 24 hours, the viscosity of the mixture had dropped considerably, indicating that cellulose had degraded over time.

Example 3

Table 2 lists the different forms of cellulose that were successfully dissolved in $ZnBr_2$ and $ZnCl_2$ salt solutions. This example demonstrates that dissolution of cellulose by $ZnBr_2$ solutions is not limited to any particular type or source of cellulose. In each example listed in Table 2, 1-5 grams of cellulosic material was mixed with 100 ml of $ZnCl_2$ or $ZnBr_2$ salt solution containing at least 70% salt by weight and the mixture was placed in an oven at 200 deg F. for 8 to 72 hours. Dissolution was verified by visual observation of the mixture.

TABLE 2

| Sample name | Source |
| --- | --- |
| Celluflow C-25 | Collaborative Laboratories (East Setauket, NY) |
| Balsa wood | — |
| Cardboard | — |
| Paper towel | — |
| Cellulose long fiber C6663 | Sigma Aldrich |
| Microgranular cellulose C6413 | Sigma Aldrich |
| Cellulose cotton linters | Sigma Aldrich |
| Cellulose medium fibers C6288 | Sigma Aldrich |
| Highly purified cellulose fibers S6790 | Sigma Aldrich |

Example 4

Zinc chloride ($ZnCl_2$) and zinc bromide ($ZnBr_2$), each manufactured from Sigma Aldrich, were dissolved in de-ionized water at various concentrations. 0.5% by weight of cellulose long fibers (C6663 manufactured from Sigma Aldrich) was added to each of these salt solutions and the mixtures were aged in an oven at 200° F. (93° C.) for 6 hours and then removed from the oven for visual observation; results are listed below.

TABLE 3

Cellulose solubility as a function of salt concentration

| Salt | Concentration (% salt by weight) | Observation |
| --- | --- | --- |
| Zinc chloride | 25 | No dissolution |
|  | 50 | No dissolution |
|  | 60 | No dissolution |
|  | 65 | Dissolved and degraded (dark solution) |
|  | 70 | Dissolved and degraded (dark solution) |
|  | 75 | Dissolved and degraded (dark solution) |
| Zinc bromide | 25 | No dissolution |
|  | 50 | No dissolution |
|  | 60 | No dissolution |
|  | 65 | No dissolution |
|  | 70 | Dissolved and degraded (dark solution) |
|  | 75 | Dissolved and degraded (dark solution) |

As shown above, Table 3 demonstrates a critical amount of zinc, greater than 60% by weight, is required to achieve dissolution of cellulose.

The foregoing disclosure and description is illustrative and explanatory thereof and it can be readily appreciated by those skilled in the art that various changes in the size, shape and materials, as well as in the details of the illustrated construction or combinations of the elements described herein can be made without departing from the spirit of the disclosure.

While the embodiments have been illustrated and described in detail in the drawings and foregoing description, the same is to be considered as illustrative and not restrictive in character, it being understood that only some embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:
1. A method of well treatment, the method comprising:
providing a well treatment composition comprised of a non-functionalized cellulose material and a halide salt composition consisting of water and a halide salt selected from the group consisting of zinc halide, calcium halide or a mixture thereof, and placing the well treatment composition within a wellbore or a subterranean formation, and wherein the halide salt composition dissolves at least a portion of the non-functionalized cellulose material.

2. The method of claim 1, wherein the providing further comprises:

placing the non-functionalized cellulose material and the halide salt composition simultaneously, separately or a combination thereof within the wellbore or the subterranean formation.

3. The method of claim 2, wherein the non-functionalized cellulose material and the halide salt composition are separately placed within the wellbore or the subterranean formation, and the method further comprises:

placing a material selected from the group consisting of: an organic acid, an inorganic acid, a halogenated alkane, an epoxide, a halogenated carboxylic acid, derivatives thereof, and combinations thereof within a wellbore.

4. The method of claim 1, wherein the non-functionalized cellulose is a particle or a fiber.

5. The method of claim 1, wherein the well treatment composition further comprises a carrier fluid that is not capable of dissolving the non-functionalized material.

6. The method of claim 5, wherein the carrier fluid does not contain zinc halide.

7. The method of claim 5, wherein the carrier fluid is viscosified.

8. The method of claim 1, wherein the method further comprises: wherein the non-functionalized cellulose material and the halide salt composition are separately placed within the wellbore or the subterranean formation, and the method further comprises:

after the placing, forming at least one plug in at least one of a perforation, a fracture, a wellbore, or the formation, the at least one plug comprised of at least the non-functionalized cellulose material of the well treatment composition, and dissolving the at least one plug using the halide salt composition, wherein the non-functionalized cellulose material and the halide salt composition are provided separately through the wellbore.

9. The method of claim 8, wherein the at least one plug is a plurality of plugs.

10. The method of claim 8, wherein the forming of the at least one plug isolates one or more regions in the subterranean formation or the wellbore.

11. The method of claim 8, wherein the at least one plug is a plurality of plugs and the plurality of plugs are formed within the wellbore to isolate one or more regions within wellbore and the providing further comprises, placing the halide salt composition into the wellbore to dissolve the plurality of plugs in the wellbore.

12. The method of claim 8, wherein the method further comprises:

after the placing, allowing the non-functionalized cellulose to form at least one plug in the fracture, wherein the fracture closes on the non-functionalized cellulose material after the well treatment composition is pumped into the fracture.

13. The method of claim 1, wherein the well treatment composition is a cement slurry, a fracturing fluid or a drilling fluid.

14. The method of claim 1, wherein the method further comprises:

providing the non-functionalized cellulose material;

providing a carrier fluid capable of suspending the non-functionalized cellulose material;

mixing the non-functionalized cellulose material and the carrier fluid to form a slurry; and placing the slurry into the wellbore.

15. The method of claim 1, wherein the halide salt in the halide salt composition is present in an amount of at least 50 weight percent based upon a total weight of the halide salt composition.

16. The method of claim 1, wherein the non-functionalized cellulose material encapsulates an additive and the halide salt composition dissolves the non-functionalized cellulose material to release the encapsulated additive.

17. A method of well treatment, the method comprising:

providing a well treatment composition comprised of a non-functionalized cellulose material and a halide solvent composition consisting of water and a halide salt, heating the composition to a temperature of at least 150° F. to dissolve the non-functionalized cellulose, pumping a chemical species into the wellbore, and reacting the chemical species with dissolved non-functionalized cellulose material to form a functionalized cellulose.

18. The method of claim 17, wherein the functionalized cellulose is capable of reacting with one or more materials selected from the group consisting of crosslinkers and breakers.

* * * * *